US012422861B2

(12) United States Patent
Nichols

(10) Patent No.: US 12,422,861 B2
(45) Date of Patent: Sep. 23, 2025

(54) METHODS AND SYSTEM FOR PREDICTING TRAJECTORIES OF UNCERTAIN ROAD USERS BY SEMANTIC SEGMENTATION OF DRIVABLE AREA BOUNDARIES

(71) Applicant: Volkswagen Group of America Investments, LLC, Reston, VA (US)

(72) Inventor: Gregory Boyd Nichols, Franklin Park, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 208 days.

(21) Appl. No.: 18/467,111

(22) Filed: Sep. 14, 2023

(65) Prior Publication Data

US 2024/0004394 A1 Jan. 4, 2024

Related U.S. Application Data

(63) Continuation of application No. 17/141,850, filed on Jan. 5, 2021, now Pat. No. 11,880,203.

(51) Int. Cl.
*G05D 1/617* (2024.01)
*B60W 60/00* (2020.01)
(Continued)

(52) U.S. Cl.
CPC ......... *G05D 1/617* (2024.01); *B60W 60/0027* (2020.02); *G01C 21/3492* (2013.01);
(Continued)

(58) Field of Classification Search
CPC . G05D 1/617; G05D 1/0214; B60W 60/0027; B60W 2554/4029; G01C 21/3492; G01C 21/3819; G08G 1/166
See application file for complete search history.

(56) References Cited

U.S. PATENT DOCUMENTS 10,545,029 B2   1/2020 Yang et al.
2008/0107345 A1*  5/2008 Melikian ............. G06V 10/255
                                          382/209
(Continued)

OTHER PUBLICATIONS

Scrapper, C. et al., "Using a priori data for prediction and object recognition in an autonomous mobile vehicle", Proc. SPIE 5083, Unmanned Ground Vehicle Technology V, (Apr. 12-15, 2003); available at: https://www.nist.gov/publications/using-priori-data-prediction-and-object-recognition-autonomous-mobile-vehicle.
(Continued)

*Primary Examiner* — Donald J Wallace
*Assistant Examiner* — Harrison Heflin

(57) ABSTRACT

Methods and systems for controlling navigation of an autonomous vehicle for traversing a drivable area are disclosed. The methods include receiving information relating to a drivable area that includes a plurality of polygons, identifying a plurality of logical edges that form a boundary of the drivable area, sequentially and repeatedly analyzing concavities of each the plurality of logical edges until identification of a first logical edge that has a concavity greater than a threshold, creating a first logical segment of the boundary of the drivable area. This segmentation may be repeated until each of the plurality of logical edges has been classified. The method may include creating and adding (to a map) a data representation of the drivable area that comprises an indication of the plurality of logical segments, and adding the data representation to a road network map comprising the drivable area.

18 Claims, 17 Drawing Sheets

(51) Int. Cl.
*G01C 21/00* (2006.01)
*G01C 21/34* (2006.01)
*G05D 1/00* (2024.01)
*G08G 1/16* (2006.01)

(52) U.S. Cl.
CPC ....... *G01C 21/3819* (2020.08); *G05D 1/0214* (2013.01); *G08G 1/166* (2013.01); *B60W 2554/4029* (2020.02)

(56) References Cited

U.S. PATENT DOCUMENTS

| | | |
|---|---|---|
| 2015/0015577 A1 | 1/2015 | Mason |
| 2019/0236948 A1 | 8/2019 | Wang et al. |
| 2019/0359205 A1 | 11/2019 | Xu et al. |
| 2020/0132477 A1* | 4/2020 | Averilla ............ G01C 21/3673 |
| 2020/0250439 A1 | 8/2020 | Vig |

OTHER PUBLICATIONS

Cai, Y. et al., "Robust Drivable Road Region Detection for Fixed-Route Autonomous Vehicles Using Map-Fusion Images" Sensors 2018, 18, 4158, available at: https://www.ncbi.nlm.nih.gov/pmc/articles/PMC6308465/pdf/sensors-18-04158.pdf.

Eising, C. et al., "DriveSpace: Towards context-aware drivable area detection", Electronic Imaging 2019 (15):42-1-42-9, available at: https://www.researchgate.net/publication/336118452_DriveSpace_Towards_context-aware_drivable_area_detection.

Yang, D. et al., "Driving Space for Autonomous Vehicles", Automotive Innovation (2019) 2:241-253, available at https://link.springer.com/article/10.1007/s42154-019-00081-1.

Vasishta, P., Building and Leveraging Prior Knowledge for Predicting Pedestrian Behaviour Around Autonomous Vehicles in Urban Environments, PhD Thesis, University Grenoble Alpes; Dec. 9, 2019.

* cited by examiner

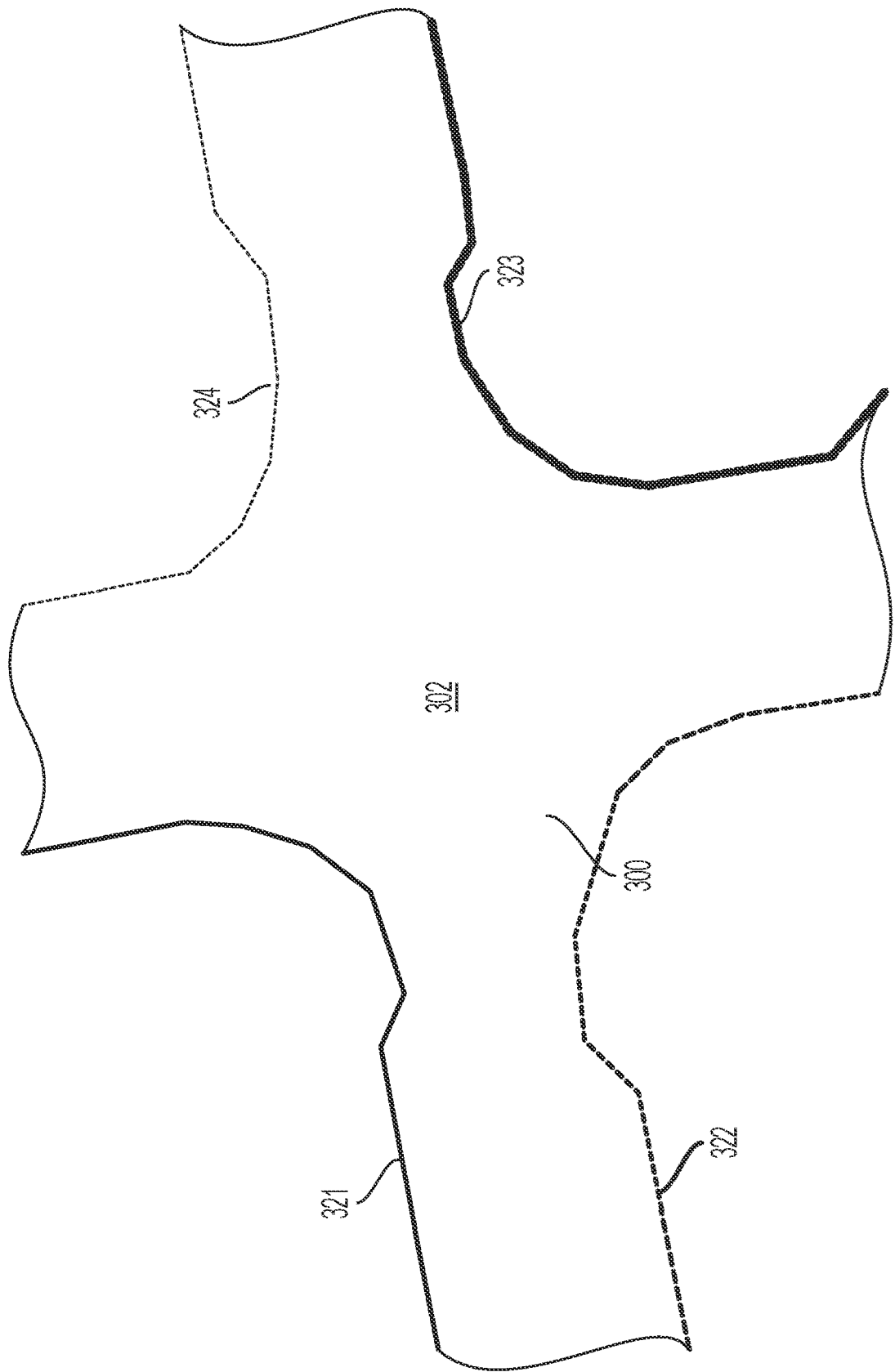

METHODS AND SYSTEM FOR PREDICTING TRAJECTORIES OF UNCERTAIN ROAD USERS BY SEMANTIC SEGMENTATION OF DRIVABLE AREA BOUNDARIES

CROSS-REFERENCE TO RELATED APPLICATIONS

This application is a continuation of U.S. patent application Ser. No. 17/141,850, filed on Jan. 5, 2021, the disclosure of which is incorporated herein by reference in its entirety.

BACKGROUND

An autonomous vehicle navigating a roadway may need to keep track of and predict what other objects in the vehicle's environment ("actors"), such as other vehicles, bikes, pedestrians, animals, etc., are going to do. The failure to do so may result in collisions, reckless and erratic driving, or other hazardous situations. Accordingly, safer driving conditions may be achieved by accurately predicting the trajectory of actors based on combining detailed map information and contextual information of other objects.

In order to predict the trajectory of actors, the autonomous vehicle may also identify a drivable area from the detailed map information. Drivable area for autonomous vehicles is a simplified representation of a real driving environment that includes areas in which vehicles are reasonably expected to be able to drive (e.g., streets, lanes, parking areas, etc.). Identification of drivable areas helps facilitate driving decision processes such as by delineating areas such as sidewalks, buildings, etc. Generally, uncertain road users (e.g., pedestrians, cyclists, etc.) within a drivable area can be assumed to have a destination that is outside of the drivable area and may follow a trajectory to the destination that includes exiting the drivable area at a target location on the drivable area boundary (e.g., corner of a sidewalk, a parking cutout, etc.). Information about potential target locations on the drivable area boundary can be used for predicting the trajectory of the actor for traversing the drivable area. However, drivable areas are typically large segments and cannot be used to infer meaningful information about smaller discrete target locations.

This document describes methods and systems that are directed to addressing the problems described above, and/or other issues.

SUMMARY

In various scenarios, systems and methods for controlling navigation of an autonomous vehicle for traversing a drivable area are disclosed. The systems may include a processor and a non-transitory computer readable medium that includes one or more programming instructions. The programming instructions may be executed by the processor to perform the methods of this disclosure. The system may receive information relating to a drivable area (including a plurality of polygons) in an environment of the autonomous vehicle. The system may then identify a plurality of logical edges that form a boundary of the drivable area, and determine whether at least one of the logical edges has a concavity greater than a threshold. If so, the system may sequentially analyze concavities of each the plurality of logical edges until identification of a first logical edge that has a concavity greater than a threshold (starting from an initial one of the plurality of logical edges and along the boundary of the drivable area). Upon identification of the first logical edge, the system may create a first logical segment of the boundary of the drivable area that includes the initial one of the plurality of logical edges, logical edges between the initial one of the plurality of logical edges and the first logical edge, and at least a portion of the first logical edge. The system may repeat these steps until each of the plurality of logical edges has been classified into one of a plurality of logical segments of the boundary of the drivable area. If at least one of the logical edges does not have a concavity greater than a threshold, the system may create a single logical segment of the drivable area boundary. The system may then create a data representation of the drivable area that comprises an indication of the plurality of logical segments or the single logical segment, and add the data representation to a road network map comprising the drivable area. A logical segment represents a potential goal of an actor when traversing the drivable area.

In various implementations, the system may use the data representation for predicting a trajectory of a pedestrian for traversing the drivable area, and using the trajectory to control navigation of the autonomous vehicle for avoiding collision with the pedestrian while traversing the drivable area. Additionally and/or alternatively, the system may use the data representation for identifying an entrance into or an exit from an unmapped area of the environment from the drivable area.

In certain other implementations, the system may identify the plurality of logical edges by identifying one or more shared edges in the drivable area, and discarding the identified one or more shared edges. A shared edge is a collinear edges of two polygons. The system may, optionally, identify adjacent edges of the two polygons and combine the adjacent edges to form a single logical edge.

In some implementations, the threshold may be determined based on one or more characteristics of a feature included in the drivable area such as, for example, a type of the feature, a size of the feature, and/or a degree of curvature of the feature. The threshold may be about 120° to about 140° and may be determined such that a pedestrian can move from one point of a logical segment of the boundary of the drivable area to another point on the logical segment following a shortest path without entering the drivable area for more than a threshold distance. Optionally, the threshold may be determined such that opposite sides of a lane within the drivable area comprise distinct logical segments.

In various implementations, the environment may include an area substantially surrounded by the drivable area on all sides such that the system may form a single logical segment of the boundary of the drivable area when it does not include one or more logical edges that have a concavity greater than the threshold. Alternatively and/or additionally, the environment may include an n-way intersection such that the system may form n logical segments of the boundary of the drivable area.

BRIEF DESCRIPTION OF THE DRAWINGS

FIG. 3B illustrates the identified logical segments in the drivable area boundary of FIG. 3A.

DETAILED DESCRIPTION

Figure 1:
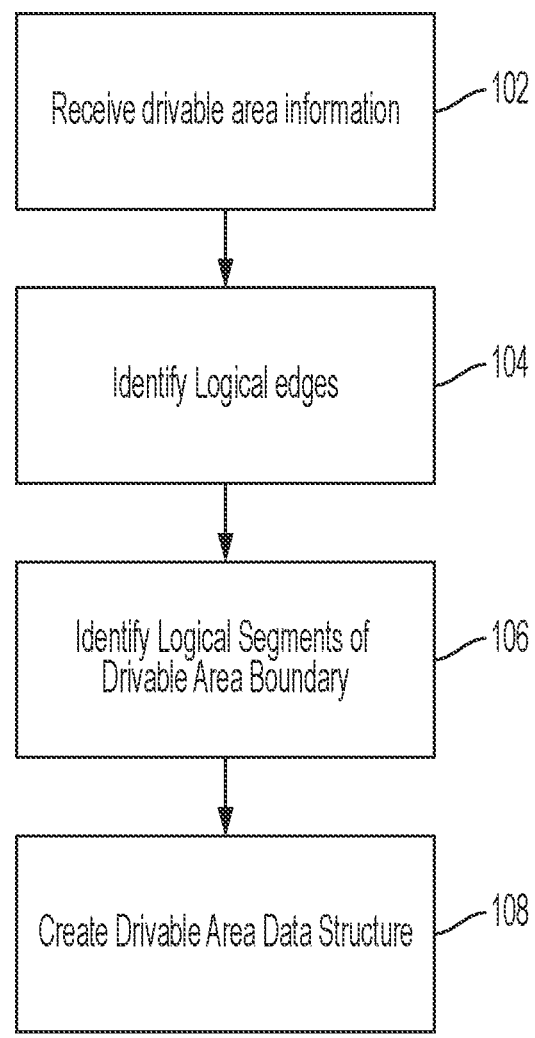
FIG. 1 illustrates a flow chart of an example method of segmenting a drivable area boundary.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Prediction of an actor's trajectory in an autonomous vehicle's environment includes identification of a goal representative of a target that the actor might care about at a given moment. For example, a vehicle following a lane might have the next lane as a goal, a pedestrian walking towards a crosswalk might have that crosswalk as a goal, or the like. In these examples, a crosswalk and a lane segment are small, discrete portions of a map that can be used for goal representation.

As discussed above, uncertain road users (e.g., pedestrians, cyclists, etc.), when occupying a drivable area such as when jaywalking, cross-walking, etc., will have a destination that is outside of the drivable area in order of reach an area of safety. In order to reach such destinations, the uncertain road users may follow a trajectory to the destination that includes exiting the drivable area at a target location on the drivable area boundary (a "goal"). Information about potential goal locations on the drivable area boundary can be used for predicting the trajectory of the actor for traversing the drivable area. However, drivable areas are typically large segments and cannot be used to infer meaningful information about smaller discrete goal locations. For example, a pedestrian might be headed towards a corner, a driveway entrance, or a parking cutout, all of which are typically part of the same drivable area boundary. For deriving useful information about a pedestrian's potential goals, the drivable area boundary may be segmented into sections that are small enough to have semantic meaning such that one section might represent a corner; another might represent a driveway entrance; or the like.

This document describes an automated method for segmenting a drivable area boundary into logical segments such that each segment may represent a potential goal for an actor (for example, a segment of the drivable area boundary that a pedestrian may use to safely exit a drivable area). Such segmentation of the drivable area boundary may allow an autonomous vehicle prediction system to infer, for example, one or more discrete goals that a pedestrian may be heading towards for and/or while traversing a drivable area. The prediction system may then use such goal locations for generating one or more trajectories for the pedestrian for traversing the drivable area, which may be used to navigate the autonomous vehicle to avoid collision with the pedestrian. Similarly, an autonomous vehicle motion planning system may utilize this segmented representation of a drivable area boundary to, for example, understand the spatial relations between different potential goal locations to handle situations where, for example, a pedestrian suddenly changes direction.

A "drivable area" is defined as the area where it is possible for an autonomous vehicle to drive, without consideration for legal restrictions. A drivable area may, optionally, be represented as a collection of one or more connected polygons (e.g., a 2-dimensional mesh). Information about drivable areas in an environment may be included in, for example, a vector map of the environment in the form of vector data (e.g., points, lines, polygons, etc.).

FIG. 1 illustrates a flow chart of an example method of segmenting a drivable area boundary. As shown in FIG. 1, a system may receive 102 drivable area information (e.g., a map) corresponding to an environment of an autonomous vehicle. The system may receive drivable area information from a data store such as, for example, a map data store. At least a portion of drivable area information may be stored in memory onboard of an autonomous vehicle, may be accessed from a remote electronic device (e.g., a remote server), may be transmitted to an autonomous vehicle via a traffic node positioned in the area in which the vehicle is traveling, may be transmitted to an autonomous vehicle from one or more sensors, and/or the like.

Figure 2A:
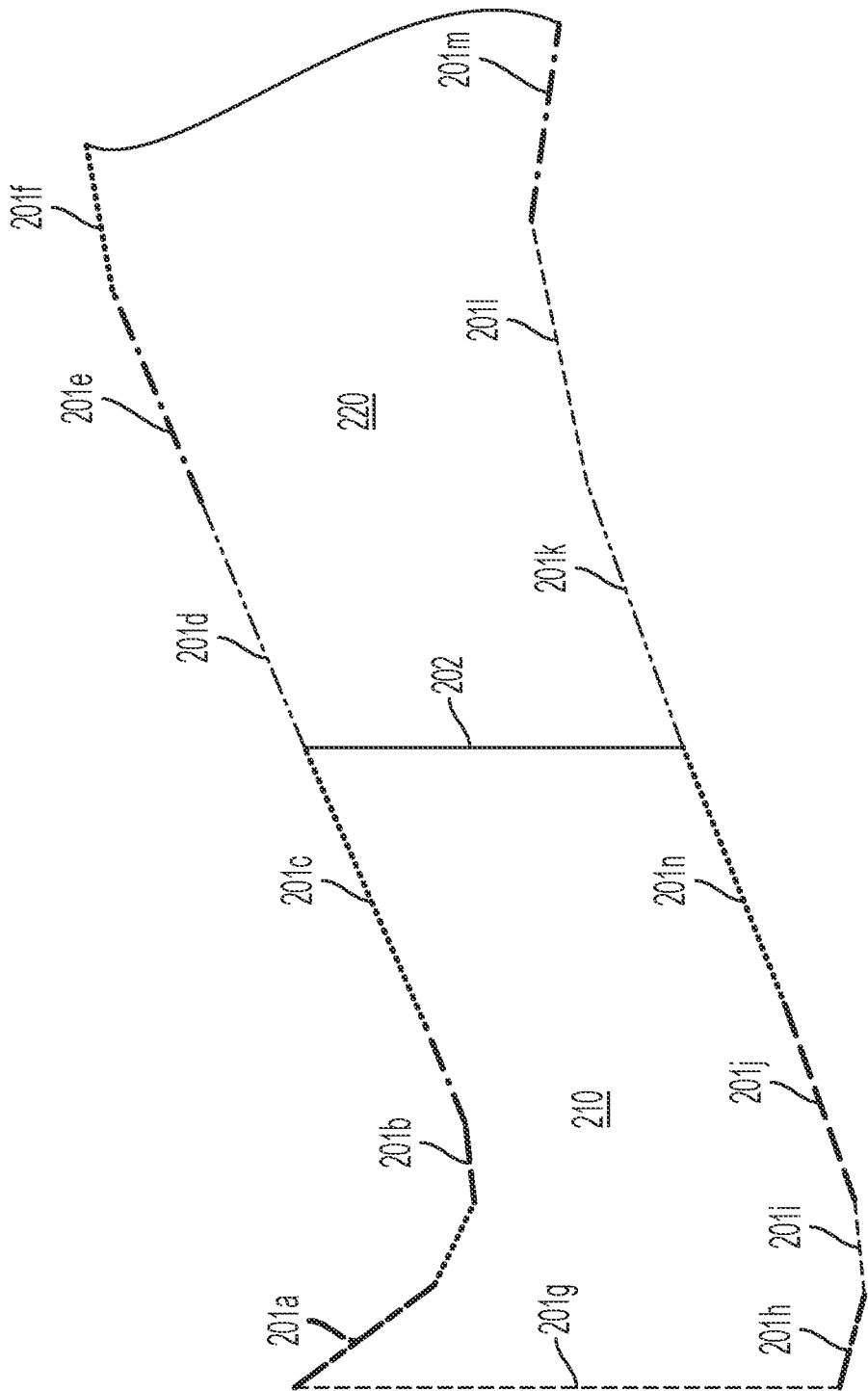
FIG. 2A illustrates an example drivable area including polygons that share edges.

In some embodiments, the drivable area map may include one or more closed polygons (some of which may be adjacent to each other) having a plurality of edges. As used in this disclosure, a "polygon" refers to a mapping construct that is associated with a section of a drivable area. A polygon may have physical edges and/or non-physical edges. As used herein, "physical edges" of a polygon are edges that are along the boundary of the drivable area, and "non-physical edges" are edges that form splits (e.g., vertical splits) within the drivable area (non-physical edges). FIG. 2A illustrates example physical edges 201a-n (shown as different line patterns) and an example non-physical edge 202 of two polygons 210 and 220.

Figure 2B:
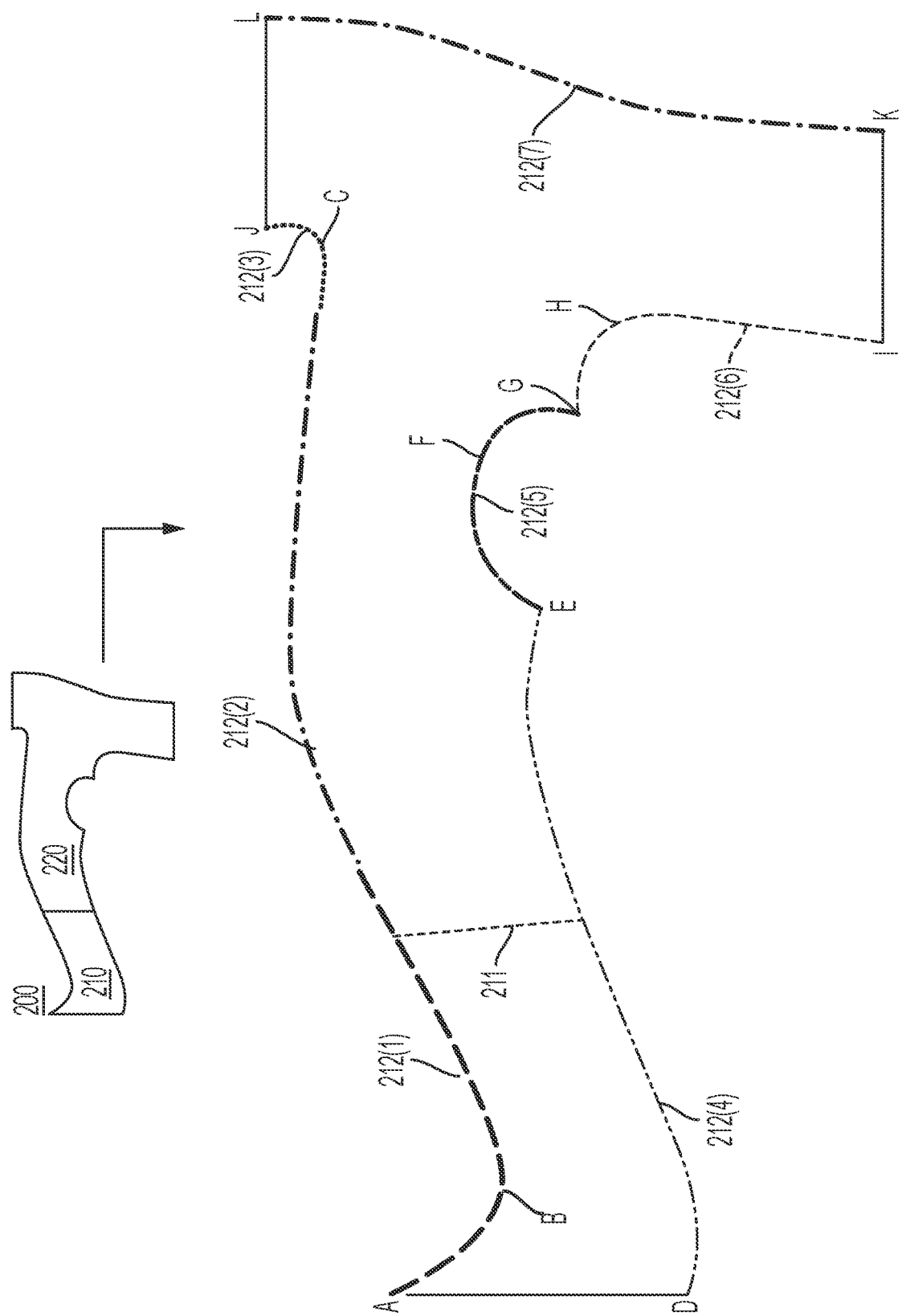
FIG. 2B illustrates the identified logical edges and segments in the drivable area.

Referring back to FIG. 1, the system may identify 104 logical edges by using the edges of the polygons of the drivable area. A logical edge is an edge that is concurrent with (or defines) the boundary of the drivable area boundary and is formed by one or more physical edges of polygons in the drivable area. In certain implementations, for identifying the logical edges the system may first identify edges that are shared by two polygons (i.e., the non-physical edges that lie within the drivable area and split the drivable area) and discarding such shared edges. In such examples, the system may determine if a first edge of a first polygon that is exactly collinear with a second edge of a second polygon, and identify the first edge and the second edge as a shared edge between the first polygon and the second polygon. The system may then, optionally, identify the adjacent physical edges of the first polygon and the second polygon as a single logical edge. For example, for a drivable area including the two polygons 210 and 220 shown in FIG. 2A, the system may discard the shared edge 202; and identify the combination of adjacent edges 201(*c*) and 201(*d*) as a first logical edge, and the combination of adjacent edges 201(*n*) and 201(*k*) as a second logical edge. FIG. 2B similarly shows the logical edges 212(1), 212(2), 212(3), 212(4), 212(5), 212(6), and 212(7) identified for the drivable area 200 including the two polygons 210 and 220 (by discarding the dashed non-physical edge 211).

This process may be repeated for all the polygons within the drivable area. The identified logical edges together form the drivable area boundary. For instance, the system may iterate through all the polygons in the drivable area to identify logical edges and discard shared edges. Optionally, the logical edges may form a plurality of updated polygons. It should be noted that edges that form opposite sides of a road/lane in a drivable area form separate logical edges.

In various embodiments, the system may store information pertaining to one or more identified logical edges in one or more data stores. This information may include, for example, an identifier associated with a logical edge, the starting and ending location of the logical edge, information about the updated polygons, and/or the like.

The system may then classify (106) the identified logical edges to group them into a plurality a logical segments of the drivable area boundary. Specifically, a logical segment may include one or more contiguous logical edges. The system may classify the logical edges by first selecting one of the identified logical edges as an initial logical edge, and then sequentially analyzing the concavity of each logical edge along the drivable area boundary (starting from the initial logical edge) until a first logical edge is identified that has a concavity greater than a threshold concavity. Upon identifying the first logical edge, the system may classify the logical edges analyzed before such identification into a first logical segment. Specifically, the first logical segment may include the initial logical edge, the logical edges analyzed before the first logical edge (i.e., edges between the initial logical edge and the first logical edge that have a concavity less than the threshold concavity), and a portion of the first logical edge. The portion of the first logical edge included in the first logical segment includes a section of the first logical edge until the highest concavity point of the first logical edge. A new logical segment may be started from the point of highest concavity. Optionally, the logical edge including the highest concavity point may be included completely either in the first logical segment or in the second logical segment.

The system may then repeat the step of sequentially analyzing the concavity of the remaining logical edges (now starting from the logical edge sequentially after first logical edge) until a second logical edge is determined to have a concavity greater than the threshold concavity. The system may then classify the remaining portion of the first logical edge, the logical edges analyzed before the second logical edge (i.e., edges between the first logical edge and the first logical edge that have a concavity less than the threshold concavity), and a portion of the second logical edge into a second logical segment. This process may be repeated for all the logical edges of the drivable area boundary by sequentially walking the logical edges along the drivable area boundary (starting from the initial logical edge) until reaching the initial logical edge again.

It should be noted that if a concavity greater than the threshold occurs within the initial logical edge itself, the system may divide the initial logical edge into two or more logical segments on either sides of the point(s) of concavity. For example, if the concavity of a logical edge between two points is greater than the threshold concavity, the system may identify the section of the logical edge between two such points as a logical segment.

If all the logical edges of the drivable area boundary are not analyzed upon reaching the initial logical edge, the system may identify a new initial logical edge and repeat the above steps. This may be the case, for example, when the drivable area include logical edges on the opposite sides of a road, lane, or the like.

In various implementations, the threshold concavity may be determined based on the characteristics of the drivable area. Examples of such characteristics may include, without limitation, type of features in the drivable area (such as curved roads/lanes, parking lots, intersections, cul-de-sacs, city blocks, inlets, road ends, medians, etc.), size of such features, degree of curvature of such features, or the like. Additionally and/or alternatively, the threshold concavity may be determined based on the nature of the goals that will be represented by the logical segments of the drivable area boundary during predictions, motion planning, etc. For example, if a logical segment represents a location where a pedestrian can exit a drivable area (i.e., when a logical segment to represent a goal for a pedestrian), the threshold concavity may be determined such that a pedestrian can move from one point to another point of the logical segment along approximately the shortest path that connects the points without entering the drivable area (i.e., each logical segment is roughly convex). Example threshold concavity for identifying logical segments representative of pedestrian goals for exiting a drivable area may be about 1100-150°, about 115°-145°, about 120°-140°, about 125°-135°, about 120°, about 125°, about 130°, about 135°, about 140°, or the like; and optionally, may be chosen based on the type of the drivable area (e.g., intersection, inlet, etc.).

For example, for the drivable area shown in FIG. 2B, the system may identify the following logical segments: logical segment AB (between points A and B), logical segment BC (between points B and C), logical segment CJ (between points C and J), logical segment DE (between points D and E), logical segment EF (between points E and F), logical segment FG (between points F and G), logical segment GH (between points G and H), logical segment HI (between points H and I), logical segment KL (between points K and L), or the like; depending on the value of the threshold concavity.

Figure 3A:
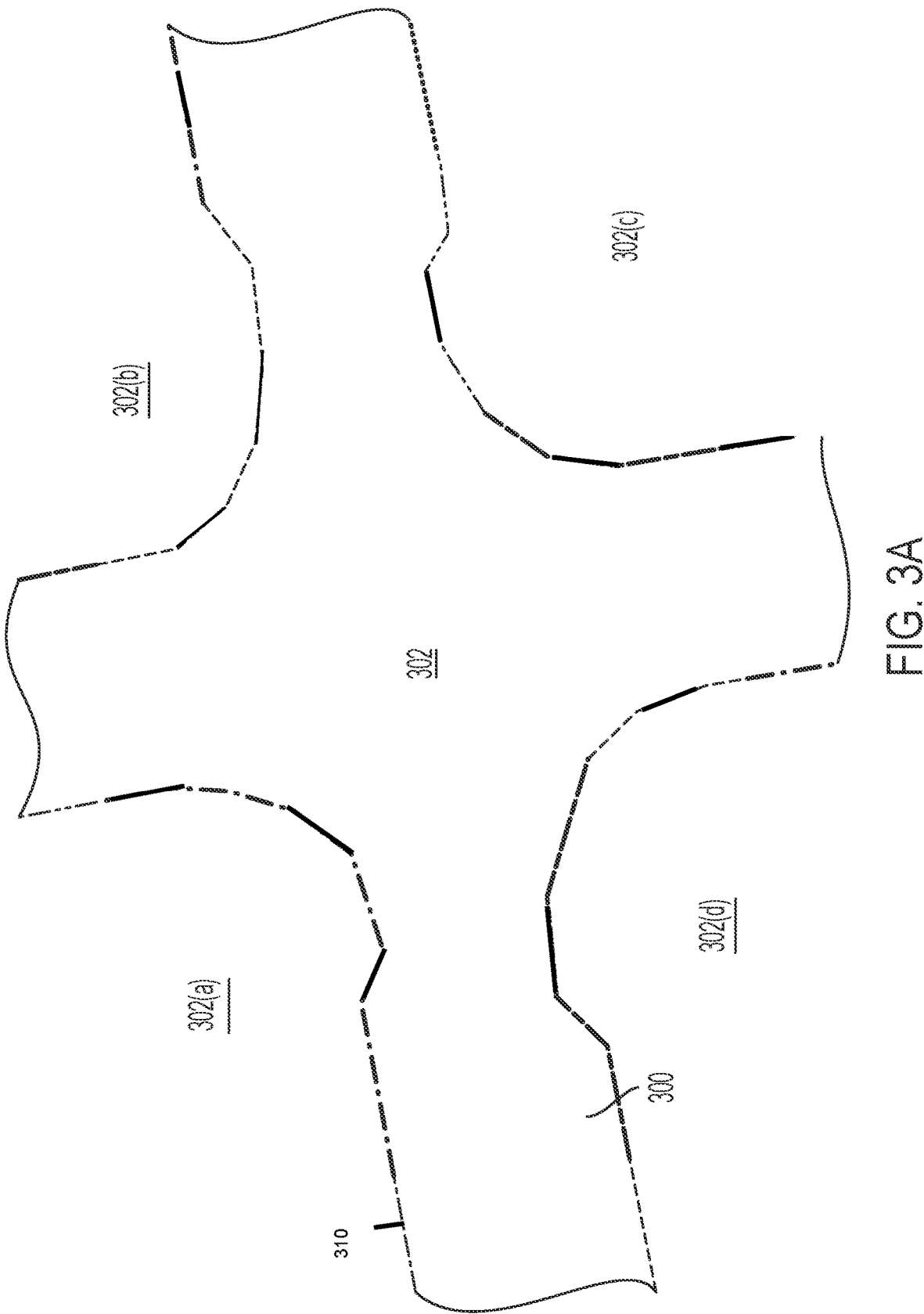
FIG. 3A illustrates an example representation of drivable area including a 4-way intersection.

The segmentation of drivable area boundary is illustrated in the example drivable area 300 shown in FIG. 3A that includes a 4-way intersection 302. The drivable area is formed by polygons (only portions of the polygons are shown as 302(*a*), 302(*b*), 302(*c*), and 302(*d*)) on all four sides of the intersection 302. The system may first identify a plurality of logical edges (shown as differently patterned lines) that form the drivable area boundary by discarding any shared edges (none in this case). The system may then analyze the logical edges of the drivable area boundary to identify logical segments, as discussed above. For example, the system may start analyzing the drivable area boundary starting at and initial logical edge (310) of each polygon until a first logical edge is identified that has a concavity greater that a threshold and/or if portions within the logical edge have a concavity greater than the threshold. The threshold concavity is selected based on the characteristics of the drivable area (i.e., and intersection having a certain size and degree of curvature) and the nature of the goal represented by the logical segment (a location where a pedestrian can exit a drivable area). As shown in FIG. 3B, since the segment 321 does not include logical edges that have a concavity greater than threshold, the system may identify segment 321 as a first logical segment. The system may then continue analyzing the drivable area boundary starting at a new initial logical edge of polygon 302(*b*) to identify the segment 322 as the next logical segment, and similarly identify logical segments 323 and 324 as individual logical segments of the drivable area boundary. Logical segments 321, 322, 323, and 324 identified in this manner may provide islands of safety for the intersection once a pedestrian is inside a logical segment. Here the 4-way intersection forms four logical segments in the drivable area boundary if the concavity of the logical edges in each segment does not exceed the threshold. Similarly, an n-way intersection may form "n" logical segments in the drivable area boundary.

Figure 4A:
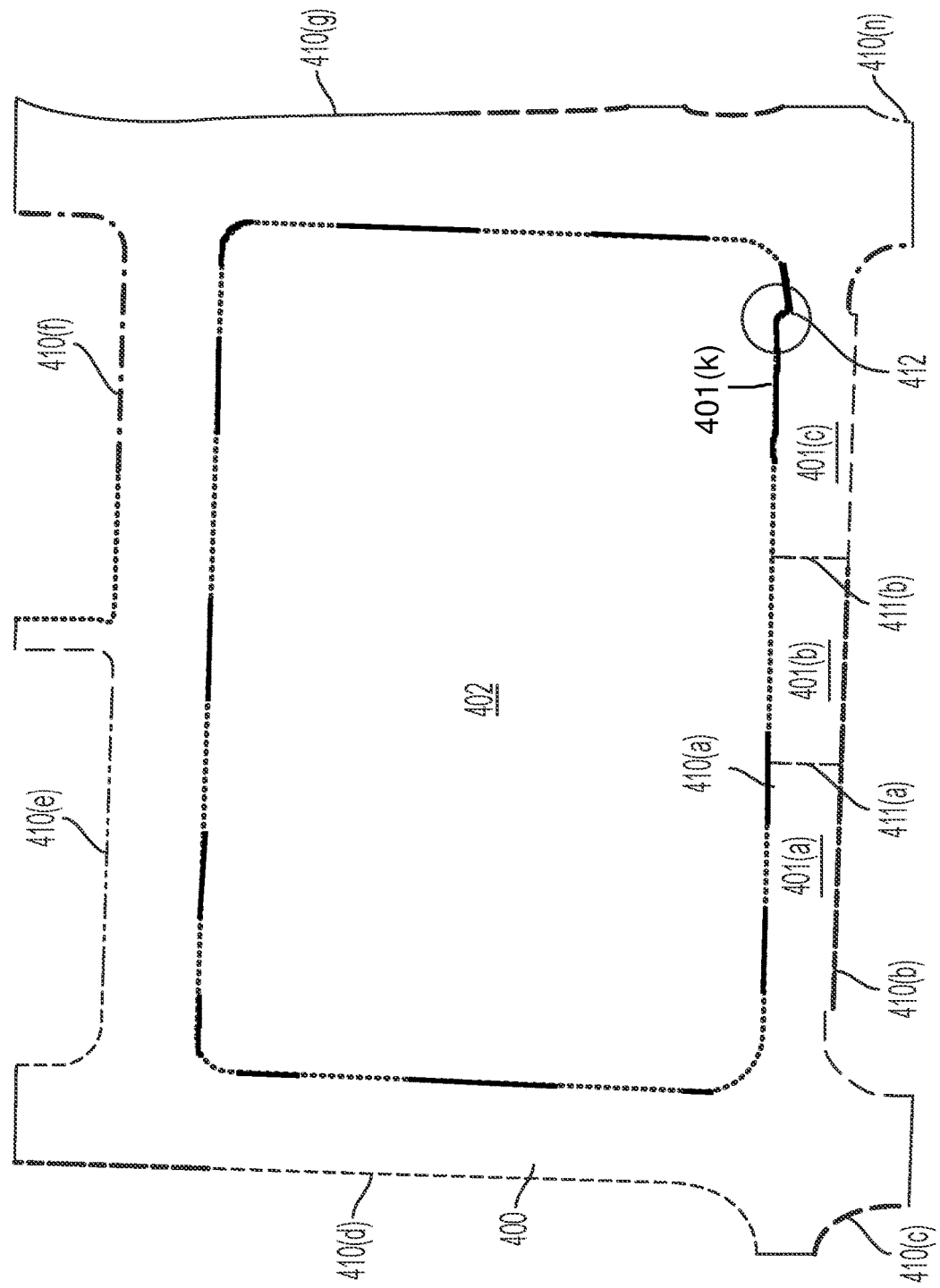
FIG. 4A illustrates an example representation of drivable area including a city block.
Figure 4B:
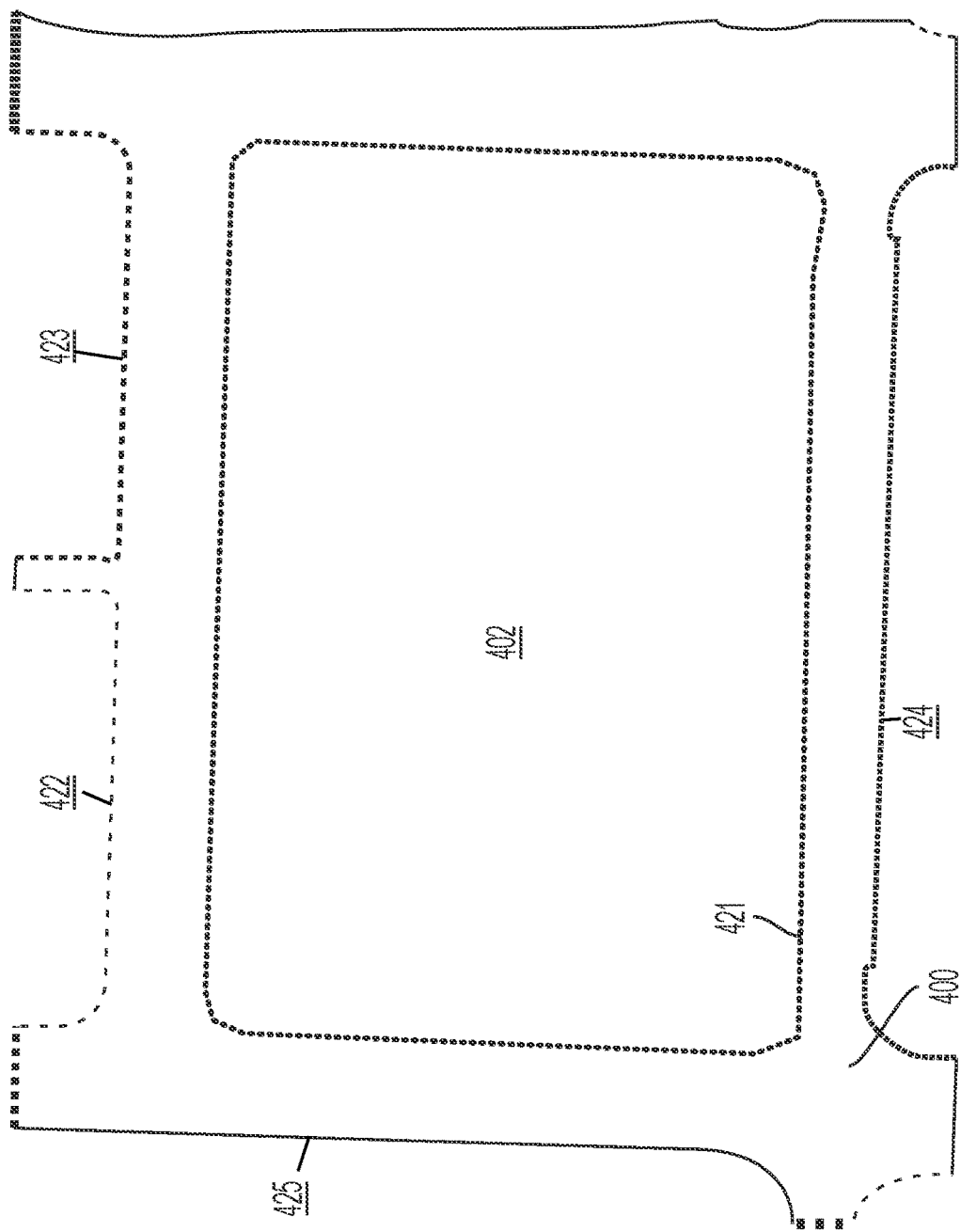
FIG. 4B illustrates the identified logical segments in the drivable area boundary of FIG. 4A.

Similarly, for the example drivable area 400 shown in FIG. 4A that includes a city block 402. The drivable area is formed by polygons 401*a-n*, and system may first identify the logical edges 410(*a*) and 410(*b*) (on opposite sides of the road/lane) by discarding shared edges 411(*a*) and 411(*b*) between polygons 401(*a*) and 401(*b*). Similarly, other logical edges 410*a-n* may be defined some of which are shown as different patterned lines (for example, by discarding other shared edges such as those between polygons 401(*b*) and 401(*c*)). The system may then analyze the logical edges of the drivable area boundary to identify logical segments, as discussed above. For example, the system may start analyzing the drivable area boundary around the city block 402 by, for example, starting at the logical edge 410(*a*), until a first logical edge is identified that has a concavity greater that a threshold. As shown in FIG. 4B, since the logical edges that form the drivable area boundary around the city block 402 do not have any portions that have a concavity greater than threshold at any point (i.e., when the concavity at point 412 is less than the threshold), the system may identify the complete city block boundary as a first logical segment 421. Similarly, the system may identify logical segments 422, 423, 424 and 425 of the drivable area boundary. Logical segments 421, 422, 423, 424 and 425 (and those shown as differently patterned lines) identified in this manner may provide islands of safety once a pedestrian is inside a logical segment.

The threshold concavity is selected based on the characteristics of the drivable area (i.e., a feature of the drivable area boundary having a certain size and degree of curvature) and the nature of the goal represented by the logical segment (a location where a pedestrian can exit a drivable area). Such a threshold concavity ignores small nooks and crannies in a drivable area boundary such that a pedestrian can still safely move from any one point to another without entering the drivable area and/or by entering the drivable area without posing a safety hazard (e.g., when a pedestrian only needs to enter a negligible distance into the drivable area, stays within a threshold distance of a curb, etc.). For determining the threshold concavity, the system may take into consideration factors such as the size of the logical segment, degree of curvature of the logical segment, distance that the path between two points on the curvature encroaches within the drivable area, or the like.

Figure 4C:
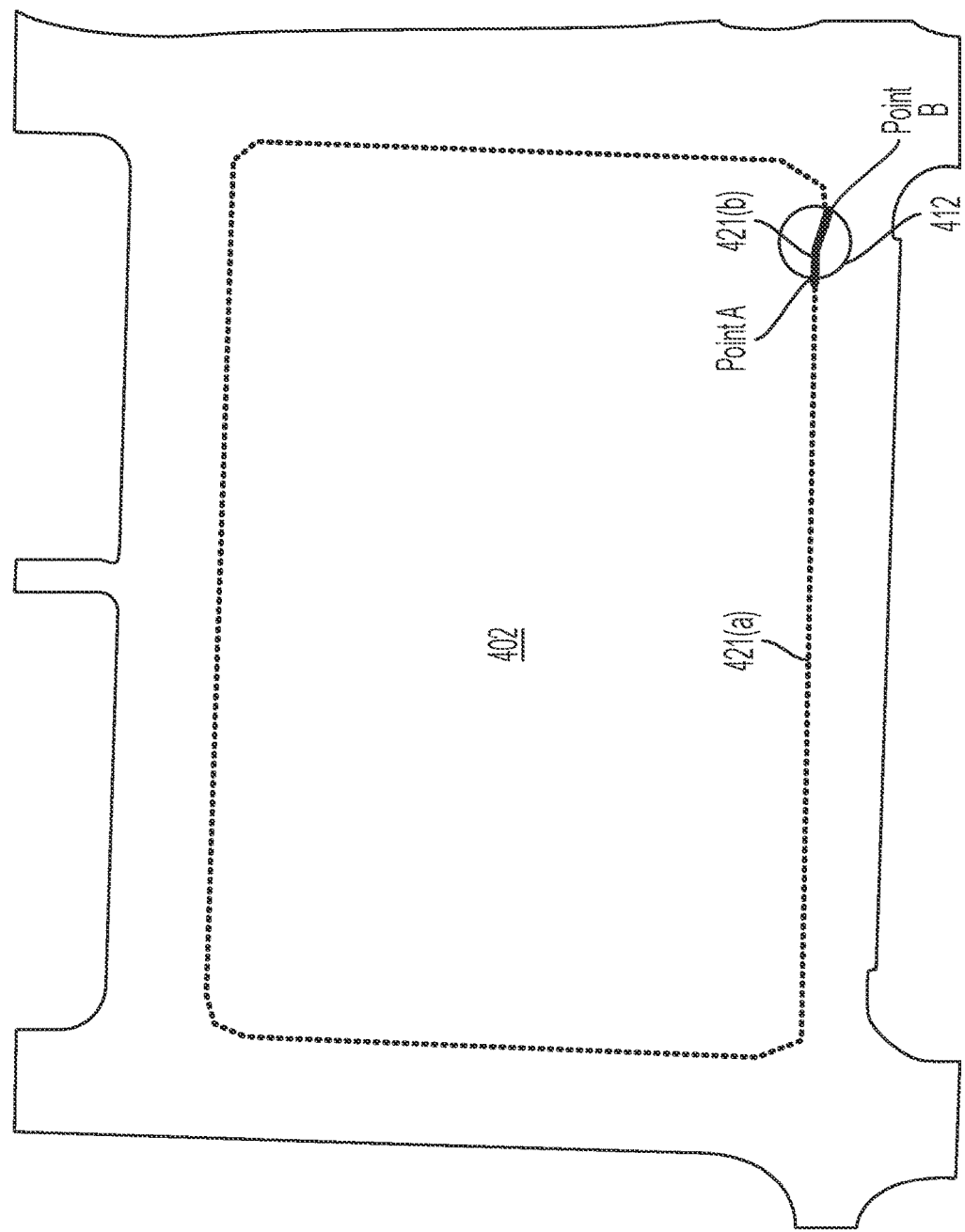
FIG. 4C illustrates the identified logical segments in the drivable area boundary of an alternative drivable area of FIG. 4A that includes a concave edge.

In the scenario of FIG. 4A, if the concavity of a portions of a logical edge is greater than the threshold concavity (e.g., a logical edge 401(*k*) including the point 412), the system may classify the drivable area boundary around the city block into two separate logical segments 421(*a*) and 421(*b*) by dividing that logical edge across the concavity point 412 (as shown FIG. 4C). This is because a pedestrian will need to enter the drivable area to move from point A to point B (that encompass point 412) in a manner that is not negligible.

Figure 4D:
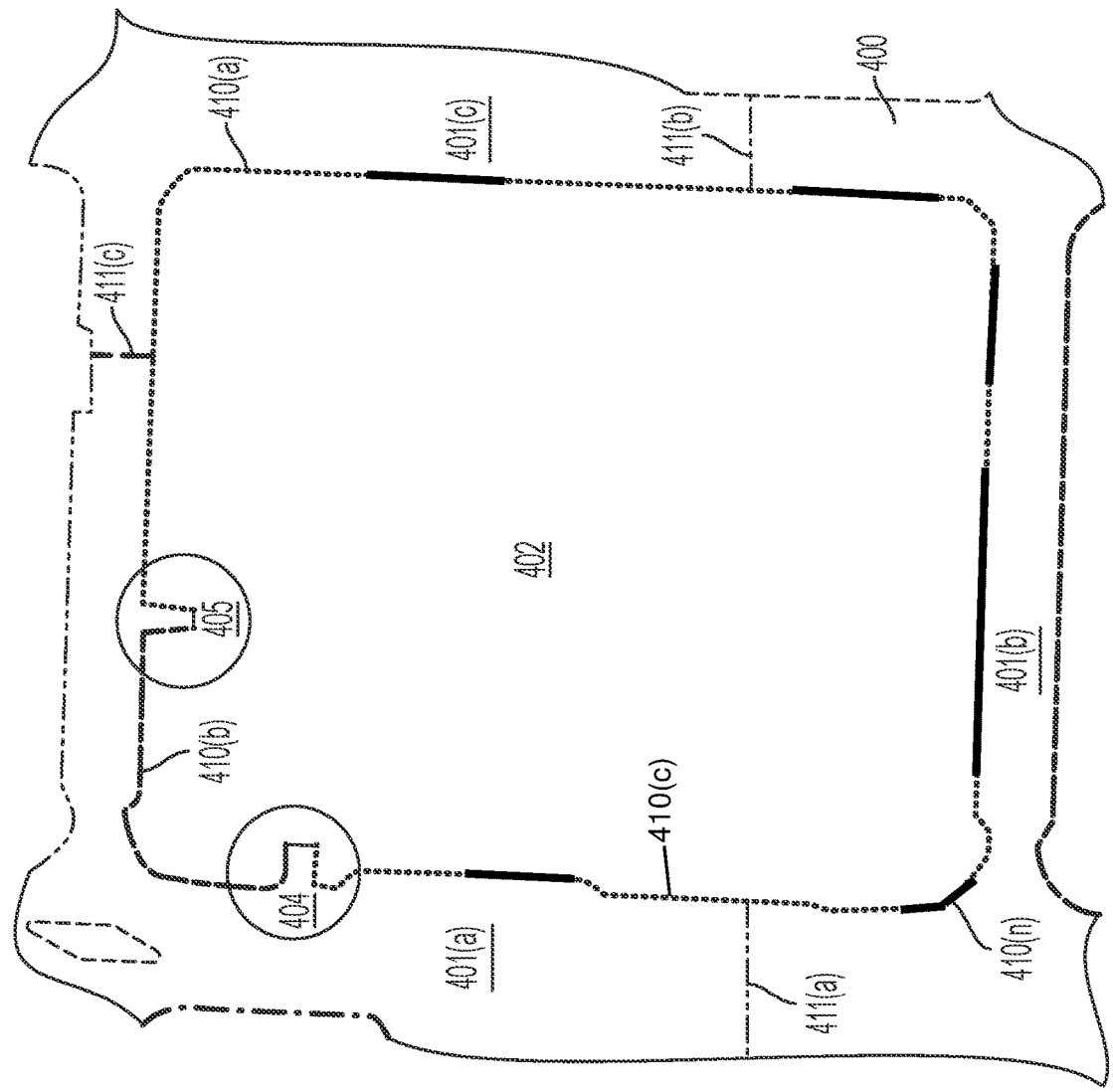
FIG. 4D an example representation of drivable area including a city block that has inlets.
Figure 4E:
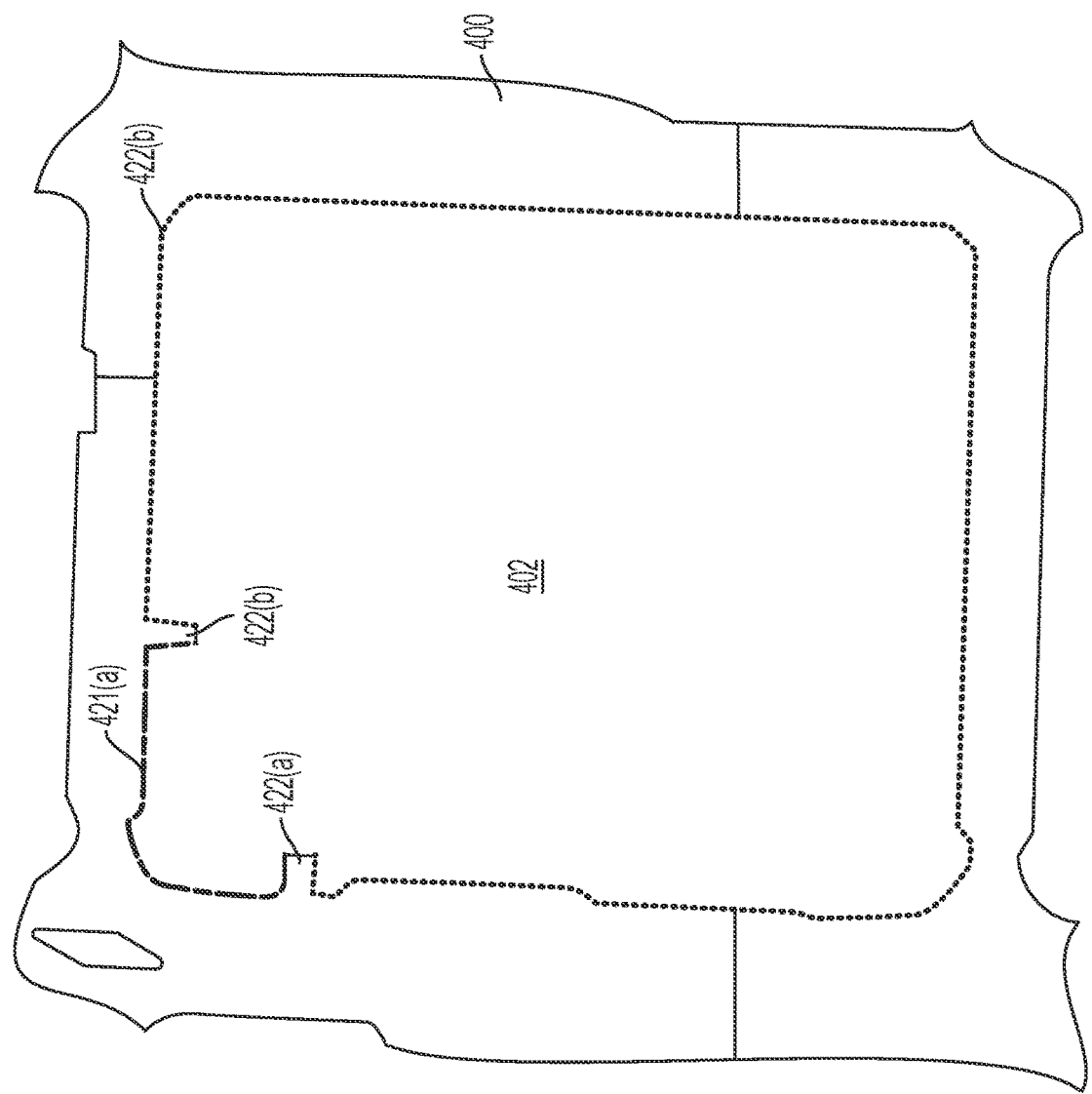
FIG. 4E illustrates the identified logical segments in the drivable area boundary of FIG. 4D.

For identifying goal locations for a pedestrian using logical segments such that the pedestrian does not need to unsafely enter the drivable area to cross from one point on a logical segment to another, the methods described above automatically define logical segments such that different sides of a road (or lane) have different logical segments. For example, when the logical edges are identified, different logical segments are formed on the different sides of the road (logical segments 421, 422, and 423 shown in FIG. 4B). The system may segment drivable area boundary around inlets (unmapped areas that branch off the drivable area such as driveways, private roadways that are intended to be driven on but are not part of the mapped drivable area) in a similar manner. For example, FIG. 4D shows the city block 402 within the drivable area 400 that includes inlets 404 and 405. The system may first identify a logical edges such as logical edges 410(*a*) and 410(*b*) . . . 410(*n*) (shown as differently patterned lines) by discarding shared edges 411(*a*), 411(*b*), and 411(*c*) between polygons 401(*a*) and 401(*b*), 401(*b*) and 401(*c*), and 401(*c*) and 401(*a*). The system may the divide the drivable area boundary around the city block 402 into logical segments 421(*a*) and 421(*b*) by dividing the logical edges across the concavities formed by the inlets as shown in FIG. 4E. The logical segments around an unmapped area such as an inlet are not connected (as shown by the gaps 422(*a*) and 422(*b*)). As such, a gap between logical segments of the drivable area boundary may be used by the autonomous vehicle to determine that there is an entrance and/or exit from a unmapped area into the drivable area.

Drivable area boundaries around medians (structures or portions that separate opposing and/or adjacent streams of traffic) in a drivable area may be similarly segmented into logical segments (i.e., using the methods described above with respect to dividing the drivable area boundary around a city block). Similar principles may be used to identify logical segments in a drivable area boundary around any other non-drivable land area that is surrounded by a drivable area on substantially all sides.

Figure 5A:
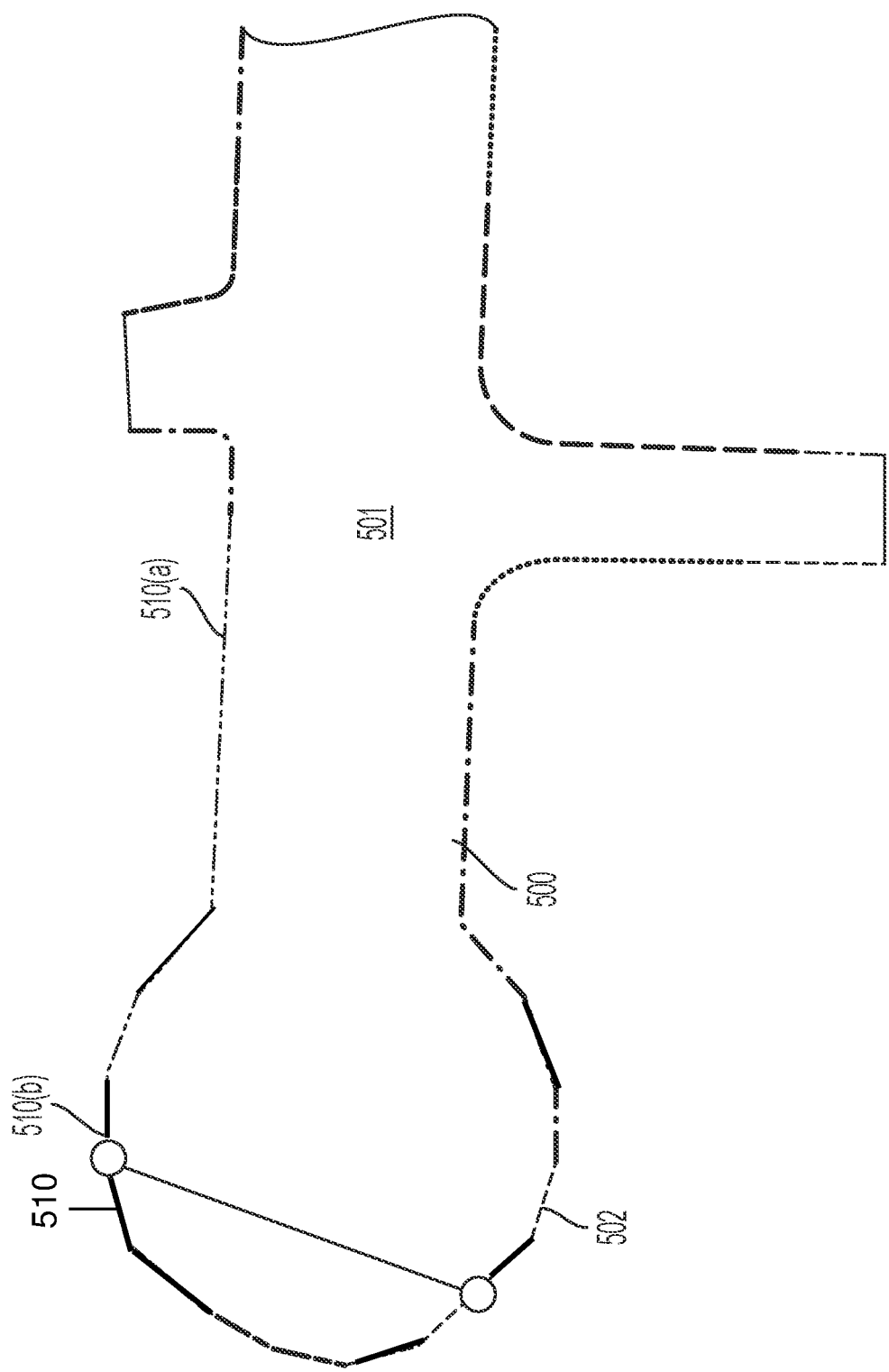
FIG. 5A illustrates an example representation of drivable area including a cul-de-sac.
Figure 5B:
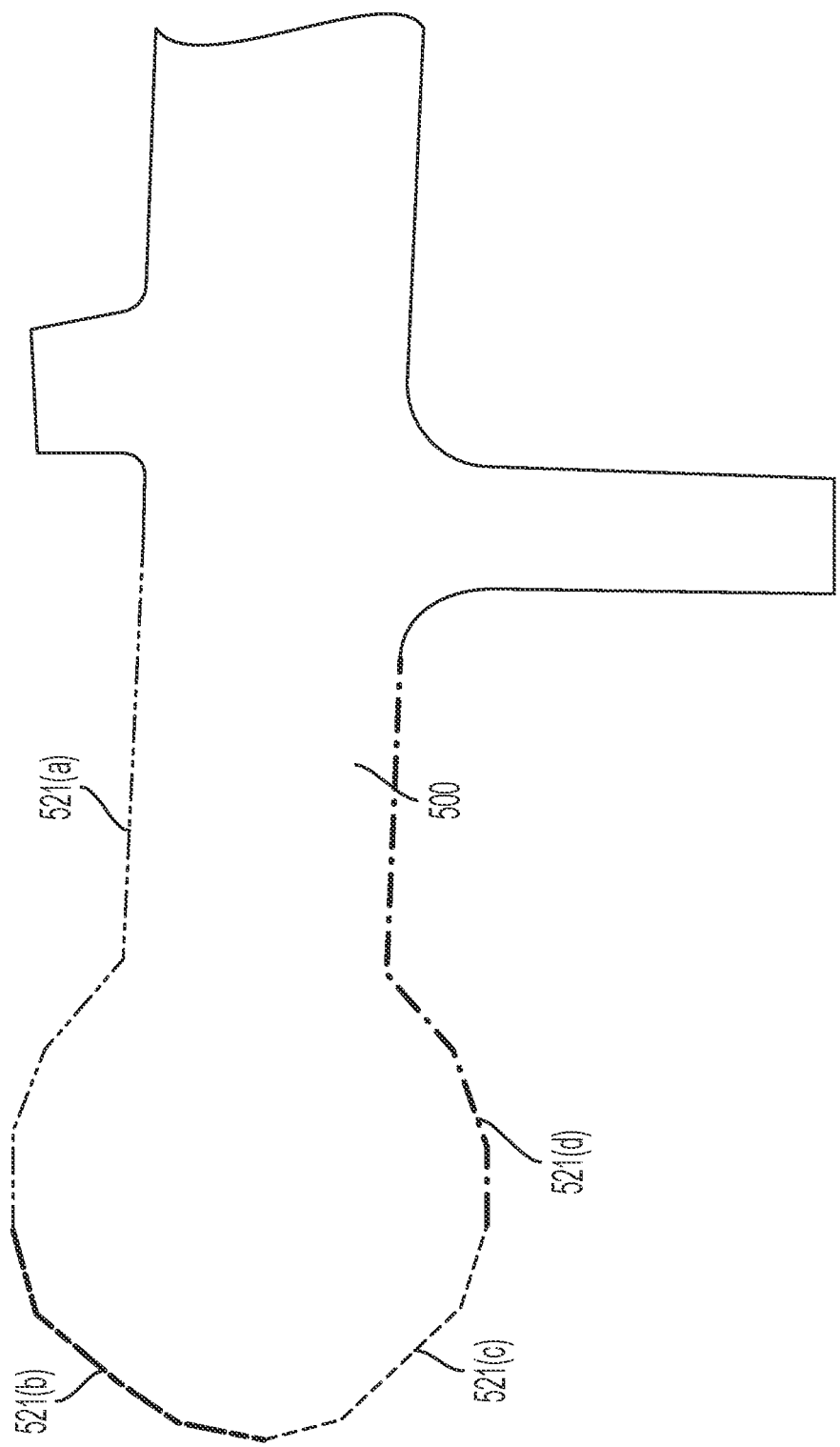
FIG. 5B illustrates the identified logical segments in the drivable area boundary of FIG. 5A.

Another example drivable area 500 that includes a cul-de-sac 502 is shown in FIG. 5. The drivable area is formed by polygon 501, and system may first identify a plurality of logical edges (shown as differently patterned lines). The system may then analyze the logical edges of the drivable area boundary around the cul-de-sac to split the logical edge into one or more logical segments, as discussed above. For example, the system may start analyzing the drivable area boundary around the cul-de-sac 502 starting at initial point 510(*a*) until a first point 510(*b*) is identified such that the portion of a logical edge 510 between the points 510(*a*) and 510(*b*) has a concavity greater than a threshold. The system may then define a first logical segment 521(*a*) that includes the logical edges between points 510(*a*) and 510(*b*). Similarly, the system may identify logical segments 521(*b*), 521(*c*), and 521(*d*) between various points of the logical edge 510 that may provide islands of safety once a pedestrian is inside a logical segment. In such implementations, the threshold concavity may be determined to, for example, keep the angle of curvature of each logical segment below an optimal value (e.g., a balance between the number of logical segments created and the distance (within the drivable area) that a pedestrian will need to go for moving between two points of the logical segment).

Figure 6A:
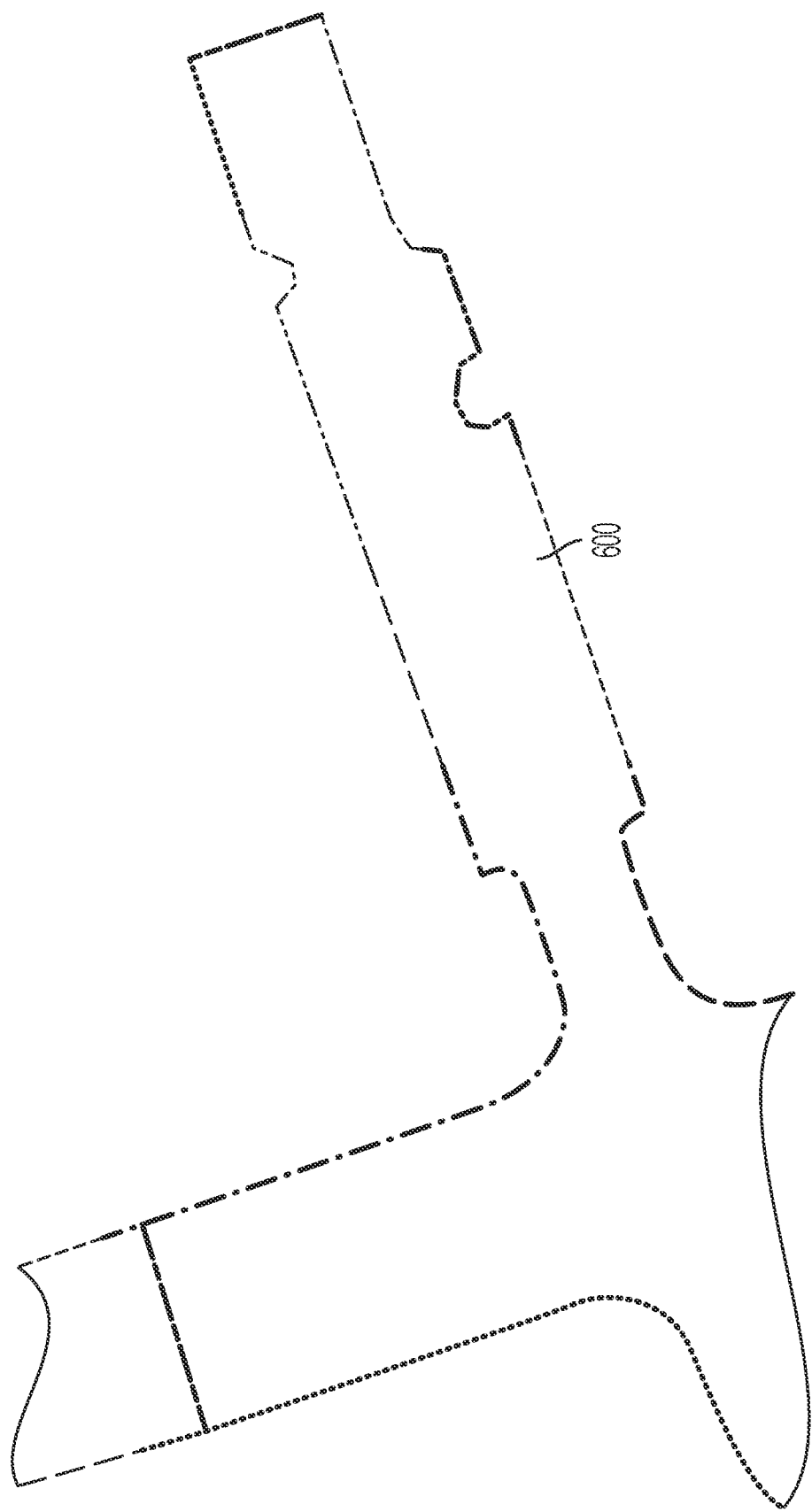
FIG. 6A illustrates an example representation of drivable area including an end of a mapped road.
Figure 6B:
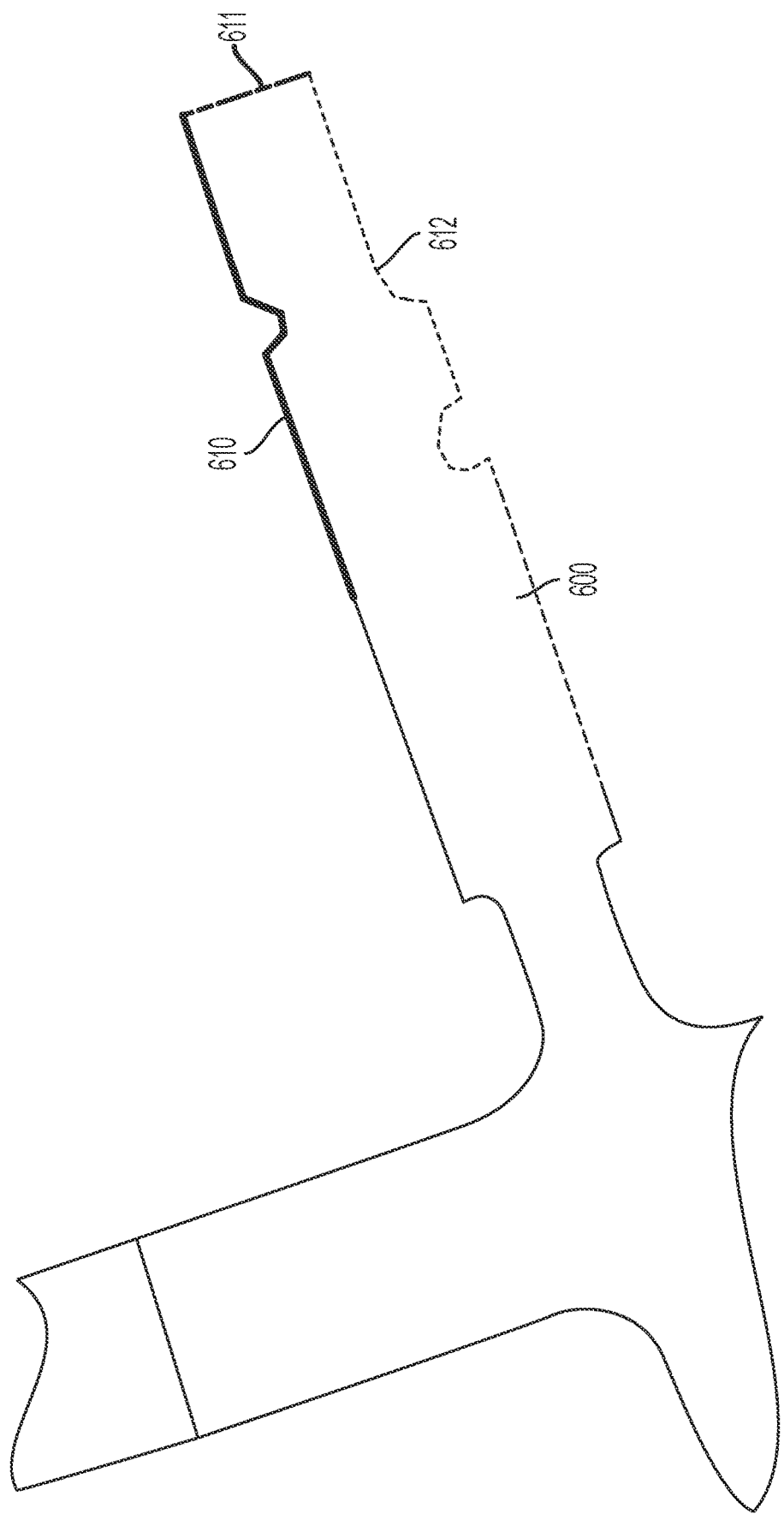
FIG. 6B illustrates the identified logical segments in the drivable area boundary of FIG. 6A.

Similar to the scenario of FIG. 5A, when the drivable area includes a lane or a road that stops at the edge of the drivable area map (as shown in FIG. 6A), the system may divide the drivable area 600 boundary around such edges into segments 610, 611, and 612 as shown in FIG. 6B using the methods described above.

In various embodiments, the system may store information pertaining to one or more identified logical segments in one or more data stores. This information may include, for example, an identifier associated with a logical segment, logical edges included in the logical segment, the starting and ending location of the logical segment, an identifier of the drivable area associated with the logical segment, and/or the like.

In various embodiments, the system may create 108 a drivable area data object for a drivable area. Such a data object refers to a data representation of a drivable in terms of logical segments of the drivable area. For example, a drivable area data object may be a data structure or other data construct. The system may assign a unique identifier to the drivable data object. The unique identifier may be random or pseudo-randomly generated. Alternatively, the unique identifier may be sequentially or otherwise assigned by the system.

The system may add a listing of the logical segments that form the drivable area boundary to the drivable area data object. The listing may include, for example, an identifier associated with each logical segment, logical edges included in each logical segment, the starting and ending locations of each logical segment on the drivable area boundary, and/or the like. For instance, the system may assign a unique segment identifier each logical segment, and may add this unique logical segment identifier to the drivable area data object.

In various embodiments, the system may store the drivable area data object in one or more data stores such that it is accessible by one or more systems or subsystems of the autonomous vehicle such as, for example, a prediction system, a perception system, a motion planning system, and/or the like. The system may also add the drivable area data object to one or more maps such as, for example, a road network map, a drivable area map, etc. As such, when the map is loaded, information pertaining to the drivable area data object may be presented to a system user. For instance, the logical segments of a drivable area may be visually displayed via one or more display devices. Other presentations of information pertaining to a drivable area data object are contemplated within the scope of this disclosure.

The drivable area data object may be used by an autonomous vehicle in a variety of ways. For example, a prediction system of an autonomous vehicle may use information within a drivable area data object to predict the behavior or trajectories of uncertain users such as pedestrians detected within a drivable area. As another example, a motion planning system of the autonomous vehicle may use information within a drivable area data object to output an autonomous vehicle trajectory for traversing the drivable area. For instance, a prediction system may predict that a particular pedestrian in the drivable area will likely head towards a particular logical segment of the drivable area boundary and may make one or more decisions concerning the operation of the autonomous vehicle based on this behavior.

As another example, an autonomous vehicle may utilize a drivable area data object to predict and/or monitor trajectories of other vehicles that do not reflect mapped paths through the intersection. For example, two logical segments around an unmapped are may be used to infer the presence of an unmapped inlet (e.g., a driveway) that another vehicle may enter into and/or exit from. As another example, an autonomous vehicle may track various statistics on an intersection-by-intersection basis to help the autonomous vehicle better understand its environment.

Figure 7:
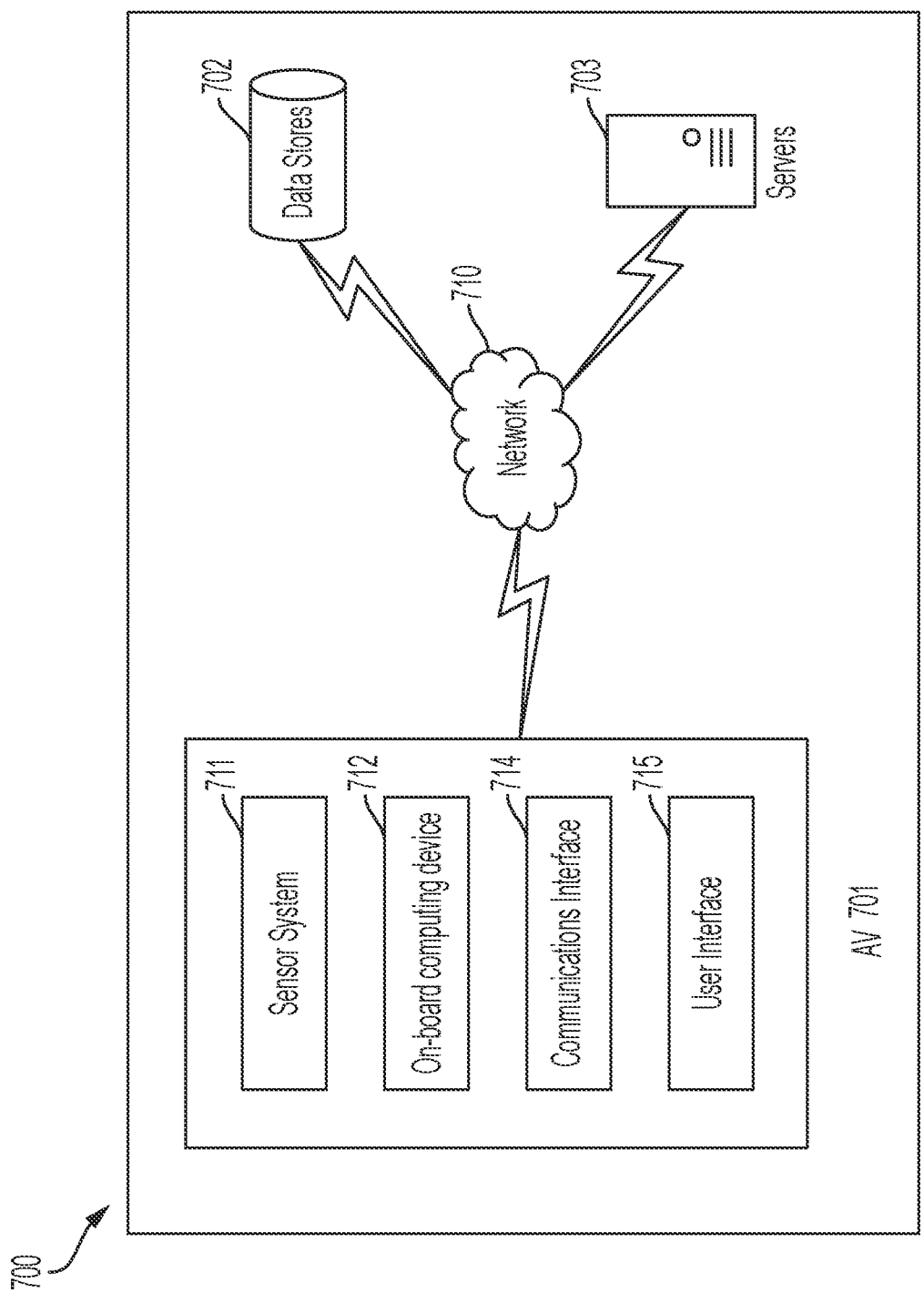
FIG. 7 is a block diagram illustrating an example autonomous vehicle system.

FIG. 7 is a block diagram illustrating an example system 700 that includes an autonomous vehicle 701 in communication with one or more data stores 702 and/or one or more servers 703 via a network 710. Although there is one autonomous vehicle shown, multiple autonomous vehicles may be coupled to each other and/or coupled to data stores 702 and/or servers 703 over network 710. Network 710 may be any type of network such as a local area network (LAN), a wide area network (WAN) such as the Internet, a cellular network, a satellite network, or a combination thereof, and may be wired or wireless. Data store(s) 702 may be any kind of data store such as, without limitation, map data store(s), traffic information data store(s), user information data store(s), point of interest data store(s), or any other type of content data store(s). Server(s) 703 may be any kind of servers or a cluster of servers, such as, without limitation, Web or cloud servers, application servers, backend servers, or a combination thereof.

As illustrated in FIG. 7, the autonomous vehicle 701 may include a sensor system 711, an on-board computing device 712, a communications interface 714, and a user interface 715. Autonomous vehicle 701 may further include certain components (as illustrated, for example, in FIG. 10) included in vehicles, such as, an engine, wheel, steering wheel, transmission, etc., which may be controlled by the on-board computing device 712 using a variety of communication signals and/or commands, such as, for example, acceleration signals or commands, deceleration signals or commands, steering signals or commands, braking signals or commands, etc.

The sensor system 711 may include one or more sensors that are coupled to and/or are included within the autonomous vehicle 701. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 701, information about the environment itself, information about the motion of the autonomous vehicle 701, information about a route of the autonomous vehicle, or the like. As autonomous vehicle 701 travels over a surface, at least some of the sensors may collect data pertaining to the surface.

The LiDAR system may include a sensor configured to sense or detect objects and/or actors in an environment in which the autonomous vehicle 701 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 3600 horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 701 such as, without limitation, other vehicles (autonomous or driven), robots, satellites, etc.

Figure 8:
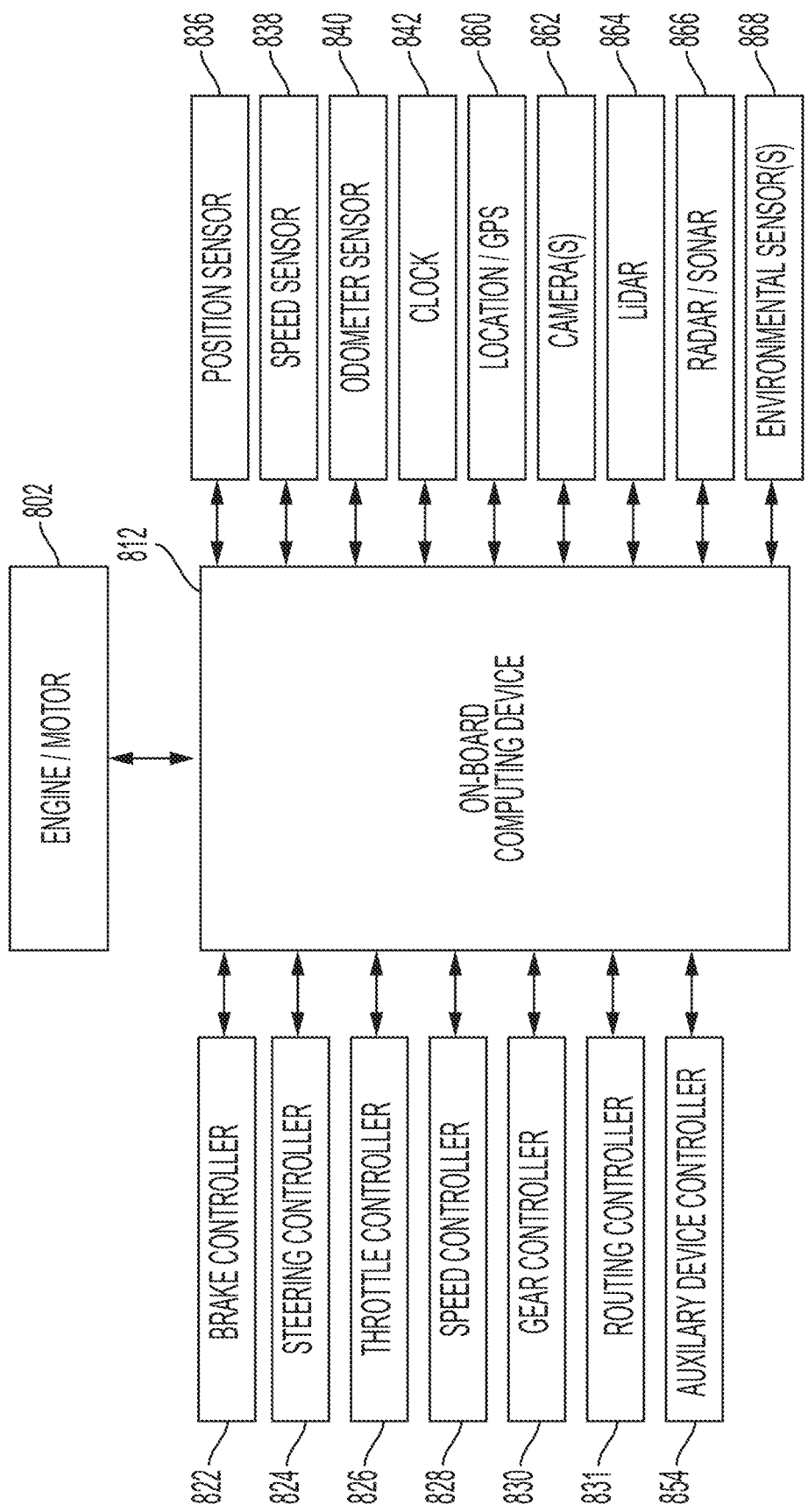
FIG. 8 illustrates an example vehicle controller system.

FIG. 8 illustrates an example system architecture for a vehicle 801, such as the autonomous vehicle 701 of FIG. 1 autonomous vehicle. The vehicle 801 may include an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle 801 also may have a clock 842 that the system architecture uses to determine vehicle time during operation. The clock 842 may be encoded into the vehicle on-board computing device 812. It may be a separate device, or multiple clocks may be available.

The vehicle 801 also may include various sensors that operate to gather information about the environment in which the vehicle is traveling. These sensors may include, for example: a location sensor 860 such as a GPS device; object detection sensors such as one or more cameras 862; a LiDAR sensor system 864; and/or a radar and or and/or a sonar system 866. The sensors also may include environmental sensors 868 such as a precipitation sensor and/or ambient temperature sensor. The object detection sensors may enable the vehicle 801 to detect objects that are within a given distance or range of the vehicle 801 in any direction, while the environmental sensors collect data about environmental conditions within the vehicle's area of travel. The system architecture will also include one or more cameras 862 for capturing images of the environment.

During operations, information is communicated from the sensors to an on-board computing device 812. The on-board computing device 812 analyzes the data captured by the sensors and optionally controls operations of the vehicle based on results of the analysis. For example, the on-board computing device 812 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers such as an auxiliary device controller 854.

Geographic location information may be communicated from the location sensor 860 to the on-board computing device 812, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors to the on-board computing device 812. The object detection information and/or captured images may be processed by the on-board computing device 812 to detect objects in proximity to the vehicle 801. In addition or alternatively, the vehicle 801 may transmit any of the data to a remote server system 703 (FIG. 1) for processing. Any known or to be known technique for making an object detection based on sensor data and/or captured images can be used in the embodiments disclosed in this document.

The on-board computing device 812 may obtain, retrieve, and/or create map data that provides detailed information about the surrounding environment of the autonomous vehicle 801. The on-board computing device 812 may also determine the location, orientation, pose, etc. of the AV in the environment (localization) based on, for example, three dimensional position data (e.g., data from a GPS), three dimensional orientation data, predicted locations, or the like. For example, the on-board computing device 812 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 812 in analyzing the surrounding environment of the autonomous vehicle 801.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 812 may also include and/or may receive information relating to the trip or route of a user, real-time traffic information on the route, or the like.

The on-board computing device 812 may include and/or may be in communication with a routing controller 831 that generates a navigation route from a start position to a destination position for an autonomous vehicle. The routing controller 831 may access a map data store to identify possible routes and road segments that a vehicle can travel on to get from the start position to the destination position. The routing controller 831 may score the possible routes and identify a preferred route to reach the destination. For example, the routing controller 831 may generate a navigation route that minimizes Euclidean distance traveled or other cost function during the route, and may further access the traffic information and/or estimates that can affect an amount of time it will take to travel on a particular route. Depending on implementation, the routing controller 831 may generate one or more routes using various routing methods, such as Dijkstra's algorithm, Bellman-Ford algorithm, or other algorithms. The routing controller 831 may also use the traffic information to generate a navigation route that reflects expected conditions of the route (e.g., current day of the week or current time of day, etc.), such that a route generated for travel during rush-hour may differ from a route generated for travel late at night. The routing controller 831 may also generate more than one navigation route to a destination and send more than one of these navigation routes to a user for selection by the user from among various possible routes.

In various embodiments, an on-board computing device 812 may determine perception information of the surrounding environment of the autonomous vehicle 801. Based on the sensor data provided by one or more sensors and location information that is obtained, the on-board computing device 812 may determine perception information of the surrounding environment of the autonomous vehicle 801. The perception information may represent what an ordinary driver would perceive in the surrounding environment of a vehicle. The perception data may include information relating to one or more objects in the environment of the autonomous vehicle 801. For example, the on-board computing device 812 may process sensor data (e.g., LiDAR or RADAR data, camera images, etc.) in order to identify objects and/or features in the environment of autonomous vehicle 801. The objects may include traffic signals, road way boundaries, other vehicles, pedestrians, and/or obstacles, etc. The on-board computing device 812 may use any now or hereafter known object recognition algorithms, video tracking algorithms, and computer vision algorithms (e.g., track objects frame-to-frame iteratively over a number of time periods) to determine the perception.

In some embodiments, the on-board computing device 812 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 812 may perform one or more prediction and/or forecasting operations. For example, the on-board computing device 812 may predict future locations, trajectories, and/or actions of one or more objects. For example, the on-board computing device 812 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 801, the surrounding environment, and/or their relationship(s). For example, if an object is a vehicle and the current driving environment includes an intersection, the on-board computing device 812 may predict whether the object will likely move straight forward or make a turn. If the perception data indicates that the intersection has no traffic light, the on-board computing device 812 may also predict whether the vehicle may have to fully stop prior to enter the intersection.

In various embodiments, the on-board computing device 812 may determine a motion plan for the autonomous vehicle. For example, the on-board computing device 812 may determine a motion plan for the autonomous vehicle based on the perception data and/or the prediction data. Specifically, given predictions about the future locations of proximate objects and other perception data, the on-board computing device 812 can determine a motion plan for the autonomous vehicle 801 that best navigates the autonomous vehicle relative to the objects at their future locations.

In one or more embodiments, the on-board computing device 812 may receive predictions and make a decision regarding how to handle objects and/or actors in the environment of the autonomous vehicle 801. For example, for a particular actor (e.g., a vehicle with a given speed, direction, turning angle, etc.), the on-board computing device 812 decides whether to overtake, yield, stop, and/or pass based on, for example, traffic conditions, map data, state of the autonomous vehicle, etc. Furthermore, the on-board computing device 812 also plans a path for the autonomous vehicle 801 to travel on a given route, as well as driving parameters (e.g., distance, speed, and/or turning angle). That is, for a given object, the on-board computing device 812 decides what to do with the object and determines how to do it. For example, for a given object, the on-board computing device 812 may decide to pass the object and may determine whether to pass on the left side or right side of the object (including motion parameters such as speed). The on-board computing device 812 may also assess the risk of a collision between a detected object and the autonomous vehicle 801. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 812 may execute one or more control instructions to perform a cautious maneuver (e.g., mildly slow down, accelerate, change lane, or swerve). In contrast, if the collision cannot be avoided, then the on-board computing device 812 may execute one or more control instructions for execution of an emergency maneuver (e.g., brake and/or change direction of travel).

As discussed above, planning and control data regarding the movement of the autonomous vehicle is generated for execution. The on-board computing device 812 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 7, the communications interface 714 may be configured to allow communication between autonomous vehicle 701 and external systems, such as, for example, external devices, sensors, other vehicles, servers, data stores, databases etc. Communications interface 714 may utilize any now or hereafter known protocols, protection schemes, encodings, formats, packaging, etc. such as, without limitation, Wi-Fi, an infrared link, Bluetooth, etc. User interface system 715 may be part of peripheral devices implemented within a vehicle 701 including, for example, a keyboard, a touch screen display device, a microphone, and a speaker, etc.

Figure 9:
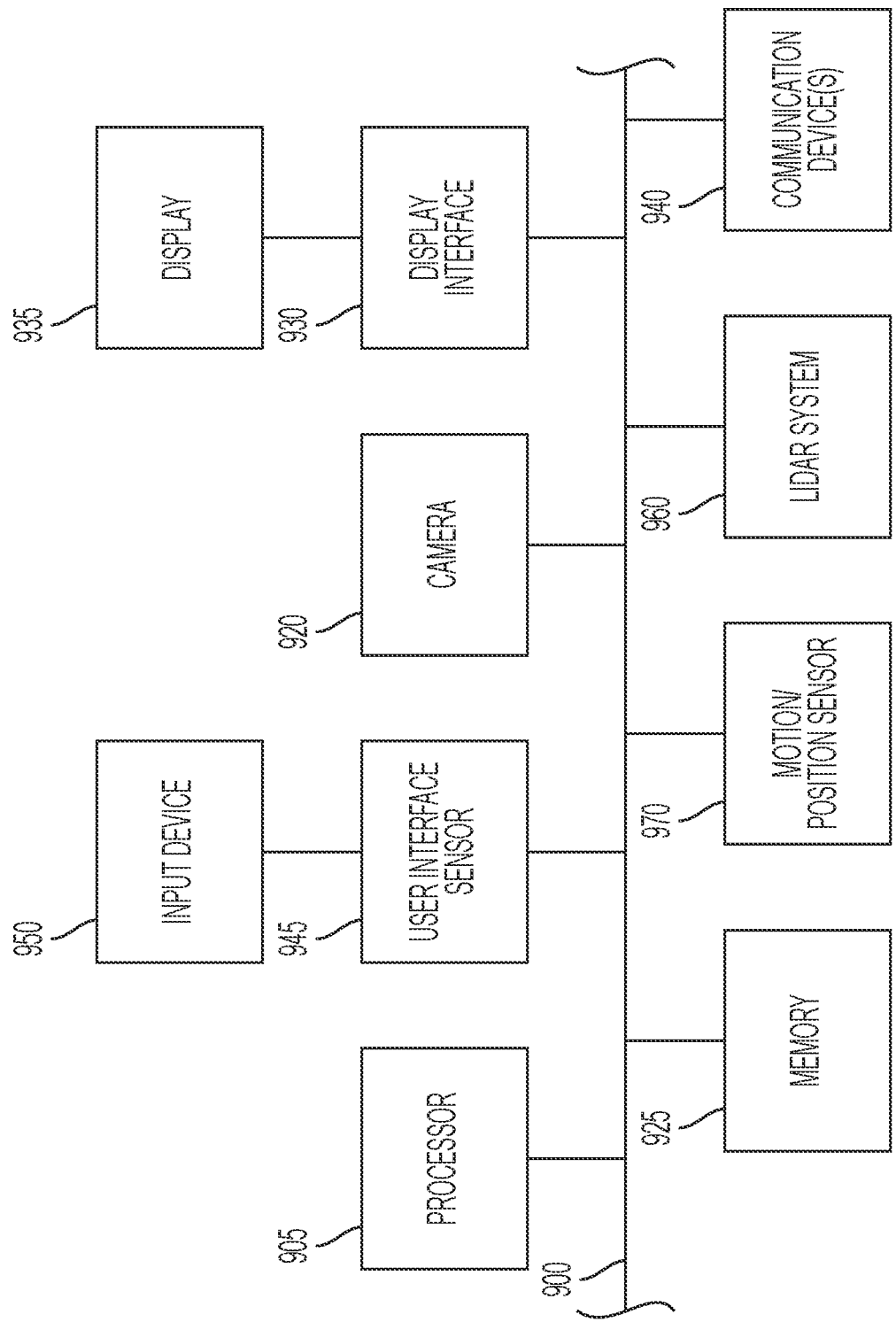
FIG. 9 is a block diagram that illustrates various elements of a possible electronic system, subsystem, controller and/or other component of an AV, and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object." As used herein, uncertain road users may include pedestrians, cyclists, individuals on roller skates, rollerblades, wheelchairs, individuals, or people in general, etc.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "concavity" refers to the angular curvature of a concave section of the drivable area boundary, where the curve of the concave section faces outwardly from the drivable area.

The term "road network map" refers to a graphical representation of one or more roads. This representation may include information pertaining to lanes, lane segments, lane boundaries, traffic lights, yielding relationships, and/or other traffic or road-related information.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for controlling navigation of an autonomous vehicle for traversing a drivable area, the method comprising, by a processor:
   receiving information relating to a drivable area in an environment of the autonomous vehicle, wherein the drivable area comprises a plurality of polygons;
   identifying a plurality of logical edges that form a boundary of the drivable area;
   determining whether there exists at least one logical edge that has a concavity greater than a threshold;
   in response to determining that there exists at least one logical edge that has the concavity greater than the threshold:
   sequentially, starting from an initial one of the plurality of logical edges and along the boundary of the drivable area, analyzing concavities of each the plurality of logical edges until identification of a first logical edge that has a concavity greater than the threshold;
   upon identification of the first logical edge:
   creating a first logical segment of the boundary of the drivable area, the first logical segment comprising:
   the initial one of the plurality of logical edges,
   logical edges between the initial one of the plurality of logical edges and the first logical edge, and
   at least a portion of the first logical edge;
   repeating the sequentially analyzing and creating steps until each of the plurality of logical edges has been classified into one of a plurality of logical segments of the boundary of the drivable area, each of the plurality of logical segments representative of a potential goal of an actor when traversing the drivable area;
   in response to determining that there does not exist at least one logical edge that has the concavity greater than the threshold, forming a single logical segment of the boundary of the drivable area;
   creating a data representation of the drivable area that comprises an indication of one or more logical segments;
   adding the data representation to a road network map comprising the drivable area;
   using the data representation for:
   predicting a trajectory of a pedestrian for traversing the drivable area; and
   using the trajectory to control navigation of the autonomous vehicle for avoiding collision with the pedestrian while traversing the drivable area.

2. The method of claim 1, further comprising using the data representation for identifying an entrance into or an exit from an unmapped area of the environment from the drivable area.

3. The method of claim 1, further comprising identifying the plurality of logical edges by:
identifying one or more shared edges in the drivable area, each of the one or more shared edges being collinear edges of two of the plurality of polygons; and
discarding the identified one or more shared edges.

4. The method of claim 3, further comprising:
identifying adjacent edges of the two of the plurality of polygons; and
combining the adjacent edges to form a single logical edge.

5. The method of claim 1, wherein the threshold is determined based on at least one or more characteristics of a feature included in the drivable area, the one or more characteristics comprising: a type of the feature; a size of the feature; or a degree of curvature of the feature.

6. The method of claim 5, wherein the threshold is about 120° to about 140° and is determined such that a pedestrian can move from one point of a logical segment of the boundary of the drivable area to another point on the logical segment following a shortest path without entering the drivable area for more than a threshold distance.

7. The method of claim 5, wherein the threshold is determined such that opposite sides of a lane within the drivable area comprise distinct logical segments.

8. The method of claim 1, further comprising determining that there does not exist at least one logical edge that has the concavity greater than the threshold when the environment comprises an area substantially surrounded by the drivable area on all sides.

9. The method of claim 1, wherein:
the environment comprises an n-way intersection; and
the methods include forming n logical segments of the boundary of the drivable area.

10. A system for controlling navigation of an autonomous vehicle for traversing a drivable area, the system comprising:
a processor; and
a non-transitory computer readable medium comprising one or more programming instructions that, when executed by a processor, will cause the processor to:
receive information relating to a drivable area in an environment of the autonomous vehicle, wherein the drivable area comprises a plurality of polygons,
identify a plurality of logical edges that form a boundary of the drivable area,
determine whether there exists at least one logical edge that has a concavity greater than a threshold;
in response to determining that there exists at least one logical edge that has the concavity greater than the threshold:
sequentially, starting from an initial one of the plurality of logical edges and along the boundary of the drivable area, analyze concavities of each the plurality of logical edges until identification of a first logical edge that has a concavity greater than a threshold,
upon identification of the first logical edge, create a first logical segment of the boundary of the drivable area, the first logical segment comprising:
the initial one of the plurality of logical edges,
logical edges between the initial one of the plurality of logical edges and the first logical edge, and
at least a portion of the first logical edge;
repeat the sequentially analyzing and creating steps until each of the plurality of logical edges has been classified into one of a plurality of logical segments of the boundary of the drivable area, each of the plurality of logical segments representative of a potential goal of an actor when traversing the drivable area,
in response to determining that there does not exist at least one logical edge that has the concavity greater than the threshold, form a single logical segment of the boundary of the drivable area;
create a data representation of the drivable area that comprises an indication of one or more logical segments,
add the data representation to a road network map comprising the drivable area;
use the data representation for:
predicting a trajectory of a pedestrian for traversing the drivable area; and
using the trajectory to control navigation of the autonomous vehicle for avoiding collision with the pedestrian while traversing the drivable area.

11. The system of claim 10, further comprising programming instructions that, when executed by a processor, will cause the processor to use the data representation for identifying an entrance into or an exit from an unmapped area of the environment from the drivable area.

12. The system of claim 10, further comprising programming instructions that, when executed by a processor, will cause the processor to identify the plurality of logical edges by:
identifying one or more shared edges in the drivable area, each of the one or more shared edges being collinear edges of two of the plurality of polygons; and
discarding the identified one or more shared edges.

13. The system of claim 12, further comprising programming instructions that, when executed by a processor, will cause the processor to:
identify adjacent edges of the two of the plurality of polygons; and
combine the adjacent edges to form a single logical edge.

14. The system of claim 10, wherein the threshold is determined based on at least one or more characteristics of a feature included in the drivable area, the one or more characteristics comprising: a type of the feature; a size of the feature; or a degree of curvature of the feature.

15. The system of claim 14, wherein the threshold is about 120° to about 140° and is determined such that a pedestrian can move from one point of a logical segment of the boundary of the drivable area to another point on the logical segment following a shortest path without entering the drivable area for more than a threshold distance.

16. The system of claim 10, further comprising programming instructions that, when executed by a processor, will cause the processor to:
identify a portion of the initial logical edge that has a first concavity greater than the threshold; and
upon identification of the portion, divide the initial logical edge into two logical segments.

17. The system of claim 10, wherein programming instructions that when executed by the processor, will cause the processor to determine that there does not exist at least one logical edge that has the concavity greater than the threshold when the environment comprises an area substantially surrounded by the drivable area on all sides.

18. The system of claim 10, wherein:

the environment comprises an n-way intersection; and the system further comprises programming instructions that when executed by the processor, will cause the processor to form n logical segments of the boundary of the drivable area.

\* \* \* \* \*